(12) United States Patent
Takase et al.

(10) Patent No.: US 11,203,967 B2
(45) Date of Patent: Dec. 21, 2021

(54) ELECTRIC HEATING TYPE SUPPORT AND EXHAUST GAS PURIFYING DEVICE

(71) Applicant: NGK INSULATORS, LTD., Nagoya (JP)

(72) Inventors: Naoya Takase, Nagoya (JP); Shinya Yoshida, Nagoya (JP); Kimihisa Kaneko, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/799,028

(22) Filed: Feb. 24, 2020

(65) Prior Publication Data

US 2020/0300151 A1 Sep. 24, 2020

(30) Foreign Application Priority Data

Mar. 18, 2019 (JP) .............................. JP2019-050466

(51) Int. Cl.
*F01N 13/18* (2010.01)
*F01N 3/20* (2006.01)
*F01N 13/16* (2010.01)
*B01D 46/24* (2006.01)

(52) U.S. Cl.
CPC ....... *F01N 13/1855* (2013.01); *F01N 3/2026* (2013.01); *B01D 46/2429* (2013.01); *F01N 13/16* (2013.01)

(58) Field of Classification Search
CPC combination set(s) only.
See application file for complete search history.

(56) References Cited

U.S. PATENT DOCUMENTS

| 8,765,068 | B2* | 7/2014 | Ishihara | H05B 3/42 |
| | | | | 422/174 |
| 10,280,819 | B2* | 5/2019 | Takase | F01N 3/28 |
| 2013/0036719 | A1* | 2/2013 | Noguchi | F01N 3/2026 |
| | | | | 55/523 |
| 2013/0224080 | A1* | 8/2013 | Ishihara | H05B 3/06 |
| | | | | 422/174 |
| 2014/0301908 | A1 | 10/2014 | Takagaki et al. | |
| 2016/0281570 | A1* | 9/2016 | Mori | F01N 3/2026 |
| 2017/0260887 | A1* | 9/2017 | Takase | B01J 35/04 |

FOREIGN PATENT DOCUMENTS

| JP | 2013/098889 A1 | 7/2013 |
| JP | 5786961 B2 | 9/2015 |

* cited by examiner

*Primary Examiner* — Binh Q Tran
(74) *Attorney, Agent, or Firm* — Burr & Brown, PLLC

(57) ABSTRACT

An electric heating support includes a honeycomb structure having an outer peripheral wall and interior porous partition walls defining a plurality of cells forming a flow path. A pair of electrode layers are disposed on a surface of the outer peripheral wall so as to face each other across a central axis of the honeycomb structure. Protective layers cover the electrode layers, respectively, such that at least a part of each electrode layer is exposed. A pair of metal terminals are provided on the electrode layers. Each electrode layer is composed of a metal-ceramic mixed member. A portion of each electrode layer that is exposed from the protective layer is electrically connected to each of the pair of metal terminals.

9 Claims, 5 Drawing Sheets

ELECTRIC HEATING TYPE SUPPORT AND EXHAUST GAS PURIFYING DEVICE

FIELD OF THE INVENTION

The present invention relates to an electric heating type support and an exhaust gas purifying device. More particularly, the present invention relates to an electric heating type support and an exhaust gas purifying device, which can satisfactorily suppress an increase in resistance due to breakage of electrode layers and deterioration of the electrode layers during electric heating.

Conventionally, a catalyst supported on a pillar shaped honeycomb structure having a plurality of partition walls that define a plurality of cells penetrating from one end face to other end face to form flow paths is used in order to purify harmful substances such as HC, CO, and $NO_x$ contained in an exhaust gas discharged from an engine of a motor vehicle or the like. Thus, when treating the exhaust gas with the catalyst supported on the honeycomb structure, it is necessary to raise the temperature of the catalyst to its activation temperature. However, at the time of starting of the engine, the catalyst does not reach the activation temperature. Therefore, there is a problem that the exhaust gas is not sufficiently purified. In particular, a plug-in hybrid vehicle (PHEV) or a hybrid vehicle (HV) includes traveling only with a motor in the travel motion, so that it has less engine start frequency and also a decreased catalyst temperature at the time of starting of the engine, which will tend to deteriorate exhaust gas purification performance.

To solve the problem, an electric heating catalyst (EHC) has been proposed, in which a pair of terminals are connected to a pillar shaped honeycomb structure composed of conductive ceramics, and the honeycomb structure itself is heated by electric conduction, so that the temperature of the catalyst can be raised to its activation temperature before starting of the engine. The EHC is desired to reduce temperature unevenness in the honeycomb structure to have a uniform temperature distribution, in order to obtain a sufficient catalytic effect.

In order to connect terminals to the honeycomb structure and generate heat in the honeycomb structure by electric conduction, it is necessary to provide surface electrodes on an outer periphery of the honeycomb structure. However, repeated electric conduction may damage the surface electrodes due to thermal stress.

To solve such problems, Patent Document 1 discloses that ceramic surface electrodes (electrode layers) are provided on an outer peripheral surface of an EHC support, and metallic stretchable members are embedded in the surface electrodes. It also discloses that according to such a configuration, even if the surface electrodes are damaged, the entire support can be electrically heated by the embedded metal stretchable members.

CITATION LIST

Patent Literature

Patent Document 1: Japanese Patent No. 5786961 B

SUMMARY OF THE INVENTION

However, as a result of studies, the present inventors have found that in the configuration disclosed in Patent Document 1, the metal stretchable member embedded in the ceramic surface electrode is easily oxidized, and it is oxidized if the surface electrode is not dense, and the function may be lost due to an increase in resistance or the like. Further, the present inventions have found that since a metal has a higher thermal expansion coefficient, the embedding of the metal stretchable member into the ceramic surface electrode may damage the surface electrode when the metal is thermally expanded by electric heating.

The present invention has been made in view of the above circumstances. An object of the present invention is to provide an electric heating type support and an exhaust gas purifying device, which can satisfactorily suppress damage to electrode layers during electric heating and an increase in resistance due to deterioration of the electrode layers.

As a result of intensive studies, the present inventors have found that the above problems are solved by forming the electrode layers from a metal-ceramic mixed member and covering each electrode layer with a protective layer such that at least a part of each electrode layer is exposed. Thus, the present invention is specified as follows:

(1)
An electric heating type support, comprising:
  a honeycomb structure comprising:
    a pillar shaped honeycomb structure portion including:
      an outer peripheral wall; and porous partition walls disposed on an inner side of the outer peripheral wall, the porous partition walls defining a plurality of cells, each of the cells penetrating from one end face to other end face to form a flow path;
    a pair of electrode layers disposed so as to face each other across a central axis of the pillar shaped honeycomb structure portion, each of the pair of electrode layers being disposed on a surface of the outer peripheral wall; and
    protective layers covering the electrode layers, respectively, such that at least a part of each of the pair of electrode layers is exposed; and
    a pair of metal terminals provided on the pair of electrode layers,
  wherein each of the pair of electrode layers is composed of a metal-ceramic mixed member, and
  wherein a portion of each of the pair of electrode layers that is exposed from the protective layer is electrically connected to each of the pair of metal terminals.

(2)
An exhaust gas purifying device, comprising: the electric heating type support according to (1); and a can body for holding the electric heating type support.

(3)
An electric heating type support, comprising:
  a honeycomb structure comprising:
    a pillar shaped honeycomb structure portion including:
      an outer peripheral wall; and porous partition walls disposed on an inner side of the outer peripheral wall, the porous partition walls defining a plurality of cells, each of the cells penetrating from one end face to other end face to form a flow path; and
    a pair of electrode layers disposed so as to face each other across a central axis of the pillar shaped honeycomb structure portion, each of the pair of electrode layers being disposed on a surface of the outer peripheral wall; and
    protective layers covering the electrode layers, respectively, such that at least a part of each of the pair of electrode layers is exposed,
  wherein each of the pair of electrode layers is composed of a metal-ceramic mixed member, and wherein each of the pair of electrode layers has a portion exposed from the protective layer, and being configured to electrical connection to each of the metal terminals.

According to the present invention, it is possible to provide an electric heating type support and an exhaust gas purifying device, which can satisfactorily suppress damage to electrode layers during electric heating and an increase in resistance due to deterioration of the electrode layers.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

Embodiment 1

(1. Electric Heating Type Support)

Figure 1:
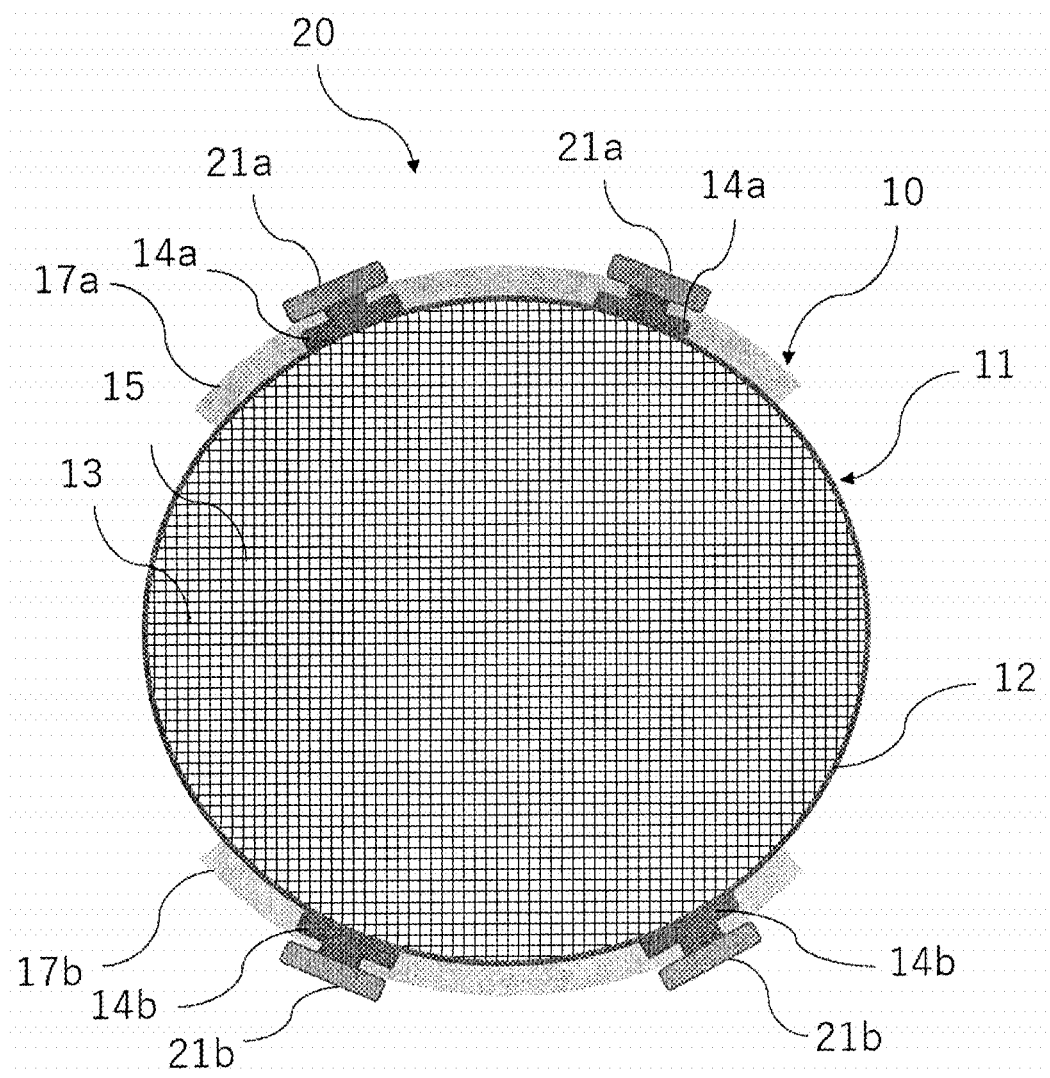
FIG. 1 is a schematic cross-sectional view of an electric heating type support according to Embodiment 1 of the present invention, which is perpendicular to a cell extending direction.

FIG. 1 is a schematic cross-sectional view of an electric heating type support 20 according to Embodiment 1 of the present invention, which is perpendicular to a cell extending direction. The electric heating type support 20 includes a honeycomb structure 10 and a pair of metal terminals 21a, 21b.

(1-1. Honeycomb Structure)

Figure 2:
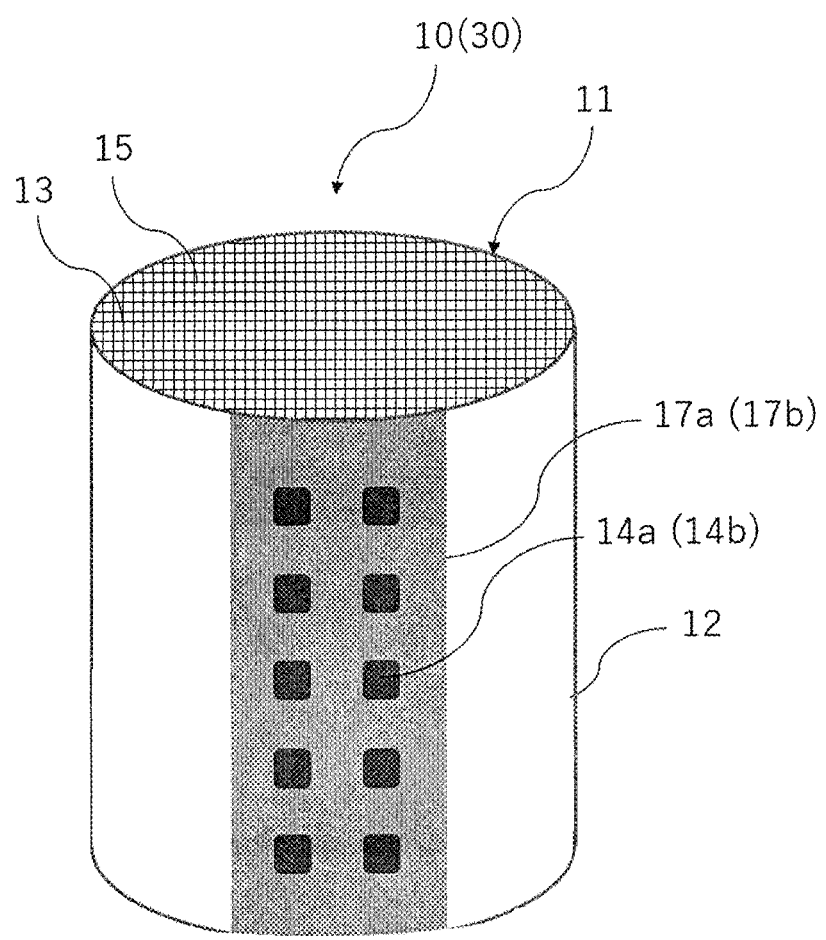
FIG. 2 is a schematic external view of a honeycomb structure according to Embodiment 1 of the present invention or an electric heating type support according to Embodiment 2 of the present invention.

FIG. 2 is a schematic external view of the honeycomb structure 10 according to Embodiment 1 of the present invention. The honeycomb structure 10 is provided with a pillar shaped honeycomb structure portion 11 including: an outer peripheral wall 12; and porous partition walls 13 which are disposed on an inner side of the outer peripheral wall 12 and define a plurality of cells 15 penetrating from one end face to other end face to form flow paths.

An outer shape of the pillar shaped honeycomb structure portion 11 is not particularly limited as long as it is pillar shaped. For example, the honeycomb structure portion can have a shape such as a pillar shape with circular end faces (circular pillar shape) and a pillar shape with polygonal (square, pentagonal, hexagonal, heptagonal, octagonal, etc.) end faces. The pillar shaped honeycomb structure portion 11 preferably has a size of each end face of from 2000 to 20000 mm$^2$, and more preferably from 5000 to 15000 mm$^2$, for the purpose of improving heat resistance (suppressing cracks entering the outer peripheral wall in a circumferential direction).

The pillar shaped honeycomb structure portion 11 is composed of conductive ceramics. Electrical resistivity of the ceramic is not particularly limited as long as the honeycomb structure 10 can generate heat by Joule heat upon electrical conduction. The electrical resistivity is preferably from 1 to 200 Ωcm, and more preferably from 10 to 100 Ωcm. In the present invention, the electrical resistivity of the pillar shaped honeycomb structure portion 11 is a value measured at 400° C. by a four-terminal method.

Examples of the ceramics forming the pillar shaped honeycomb structure portion 11 include, but not limited to, oxide ceramics such as alumina, mullite, zirconia, and cordierite, and non-oxide ceramics such as silicon carbide, silicon nitride, and aluminum nitride. Further, a silicon carbide-metallic silicon composite material, a silicon carbide/graphite composite material, or the like can also be used. Among them, from the viewpoint of compatibility of heat resistance and conductivity, preferably, the material of the honeycomb structure portion 11 is mainly based on a silicon-silicon carbide composite material or silicon carbide, and more preferably, it is a silicon-silicon carbide composite material or silicon carbide. The phrase "the material of the honeycomb structure portion 11 is mainly based on a silicon-silicon carbide composite" means that the pillar shaped honeycomb structure portion 11 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the material of the honeycomb structure portion 10 is mainly based on silicon carbide" means that the honeycomb structure portion 11 contains 90% by mass or more of silicon carbide (total mass) based on the entire honeycomb structure.

When the material of the pillar shaped honeycomb structure portion 11 is the silicon-silicon carbide composite material, a ratio of a "mass of silicon as a bonding material" contained in the pillar shaped honeycomb structure portion 11 to the total of a "mass of silicon carbide particles as an aggregate" contained in the pillar shaped honeycomb structure portion11 and a "mass of silicon as a bonding material" contained in the pillar shaped honeycomb structure portion 11 is preferably from 10 to 40% by mass, and more preferably from 15 to 35% by mass. When it is 10% by mass or more, the strength of the pillar shaped honeycomb structure portion 11 is sufficiently maintained. When it is 40% by mass or less, the shape is easily maintained during firing.

A shape of each cell in a cross section perpendicular to an extending direction of the cells 15 is not limited, but it is preferably a square, a hexagon, an octagon, or a combination thereof. Among these, the square and the hexagon are preferred. Such a cell shape can lead to a decreased pressure loss upon flowing of an exhaust gas through the honeycomb structure 10, resulting in improvement of purification performance of the catalyst. The rectangle is particularly preferable in terms of easily achieving both structural strength and heating uniformity.

Each of the partition walls 13 forming the cells 15 preferably has a thickness of from 0.1 to 0.3 mm, and more preferably from 0.15 to 0.25 mm. The thickness of each partition wall 13 of 0.1 mm or more can suppress a decrease in the strength of the honeycomb structure. The thickness of each partition wall 13 of 0.3 mm or less can suppress an increase in pressure loss upon flowing of an exhaust gas, when the honeycomb structure is used as a catalyst support and a catalyst is supported thereon. In the present invention, the thickness of the partition wall 13 is defined as a length of a portion passing through the partition wall 13, among line segments connecting centers of gravity of the adjacent cells 15 in a cross section perpendicular to the extending direction of the cells 15.

The honeycomb structure 10 preferably has a cell density of from 40 to 150 cells/cm$^2$, and more preferably from 70 to 100 cells/cm$^2$, in a cross section perpendicular to a flow path direction of cells 15. The cell density in such a range can increase the purification performance of the catalyst while reducing the pressure loss upon flowing of an exhaust gas. If the cell density is lower than 40 cells/cm$^2$, a catalyst supporting area may decrease. If the cell density is higher than 150 cells/cm$^2$, a pressure loss upon flowing of an exhaust gas may be increased when the honeycomb structure 10 is used as a catalyst support and a catalyst is supported thereon. The cell density is a value obtained by dividing the number of cells by an area of one end face of the pillar shaped honeycomb structure portion 11 excluding the outer peripheral wall 12.

The provision of the outer peripheral wall 12 of the honeycomb structure 10 is useful in terms of ensuring the structural strength of the honeycomb structure 10 and preventing a fluid flowing through the cells 15 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall and the partition wall13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition walls 13 can be porous. A porosity of the partition wall 13 is preferably from 35 to 60%, and more preferably from 35 to 45%. The porosity of 35% or more can lead to more easy suppression of deformation during firing. The porosity of 60% or less can allow the strength of the honeycomb structure to be sufficiently maintained. The porosity is a value measured by a mercury porosimeter.

The partition walls 13 of the pillar shaped honeycomb structure portion 11 preferably have an average pore diameter of from 2 to 15 μm, and more preferably from 4 to 8 μm. The average pore diameter of 2 μm or more can prevent excessively high electric resistivity. The average pore diameter of 15 μm or less can prevent excessively low electric resistivity. The average pore diameter is a value measured by a mercury porosimeter.

The honeycomb structure 10 includes a pair of electrode layers 14a, 14b disposed on the surface of the outer peripheral wall 12 of the pillar shaped honeycomb structure portion 11, so as to face each other across a center axis of the pillar shape honeycomb structure portion 11.

The electrode layers 14a, 14b may be formed in a non-limiting region. In terms of enhancing uniform heat generation of the pillar shaped honeycomb structure portion 11, each of the electrode layers 14a, 14b is preferably provided so as to extend in a form of belt in the circumferential direction and the extending direction of the cells 15. More particularly, It is desirable that each of the electrode layers 14a, 14b extends over a length of 80% or more, and preferably 90% or more, and more preferably the full length, between both end faces of the pillar shaped honeycomb structure portion 11, from the viewpoint that a current easily spreads in an axial direction of each of the electrode layers 14a, 14b. Further, the electrode layers 14a, 14b may be scattered on the outer surface of the outer peripheral wall 12. When the electrode layers 14a, 4b are scattered, the electrode layers 14a, 14b are preferably provided at equal distances on the outer surface of the outer peripheral wall 12 in the circumferential direction of the outer peripheral wall 12 and in the extending direction of the cells 15, thereby improving uniform heat generation of the pillar shaped honeycomb structure portion 11. The electrode layers 14a, 14b shown in FIGS. 1 and 2 are provided such that a pair of electrode layers 14a, 14b are each scattered on the surface of the pillar shaped honeycomb structure portion 11. More particularly, it illustrates an example where a pair of electrode layers 14a, 14b are provided at total ten positions: two positions in the circumferential direction of the pillar shaped honeycomb structure portion 11 and at five positions in the extending direction of the cells 15.

Each of the electrode layers 14a, 14b is composed of a metal-ceramic mixed member. With such a configuration, the electric heating type support 20 according to Embodiment 1 of the present invention does not require a metallic stretchable member to be embedded in the ceramic electrode layer in order to suppress damage to the electrode layers. That is, since the electrode layers 14a, 14b themselves are formed of ceramics containing a metal, it is not necessary to form the electrode layers by separating them into the ceramics and the metal spreadable member which have significantly different thermal expansion coefficients as described above. Therefore, breakage of the electrode layers due to a difference in thermal expansion during electric heating can be satisfactorily suppressed.

Examples of the metal contained in the metal-ceramic mixed member in the electrode layers 14a, 14b include a single metal of Cr, Fe, Co, Ni, Si or Ti, or an alloy containing at least one metal selected from the group consisting of those metals. Non-limiting examples of the ceramic contained in the metal-ceramic mixed member in the electrode layers 14a, 14b include silicon carbide (SiC), metal compounds such as metal silicides such as tantalum silicide ($TaSi_2$) and chromium silicide ($CrSi_2$), and further a composite material comprised of a combination of one or more of the conductive ceramics and one or more of the above metals (cermet). Specific examples of the cermet include a composite material of metallic silicon and silicon carbide, a composite material of metallic silicide such as tantalum silicide and chromium silicide, metallic silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. As the material of the electrode layers 14a, 14b, among the various metals and ceramics as described above, a combination of a metal silicide such as tantalum silicide and chromium silicide with a composite material of metallic silicon and silicon carbide is preferable, because it can be fired simultaneously with the pillar shaped honeycomb structure portion, which contributes to simplification of the producing steps.

The electrode layers 14a, 14b are preferably composed of a metal-ceramic mixed member having a metal ratio of from 30 to 75% by volume. The ratio of the metal of 30% by volume or more can lead to a further improved joining property by welding or thermal spraying to an external metal terminal such as a power cable. The ratio of the metal of 75% by volume or less can result in higher thermal expansion than that of the protective layer, so that cracking in the protective layer can be suppressed. The ratio of the metal in the electrode layers 14a, 14b is more preferably from 40 to 75% by volume, and still more preferably from 60 to 75% by volume, because the conductive resistance is reduced.

The honeycomb structure 10 has protective layers 17a, 17b that cover the electrode layers 14a, 14b, respectively, such that at least a part of the electrode layers 14a, 14b is exposed. Further, as described later, portions 18 of the electrode layers 14a, 14b exposed from the protective layers 17a, 17b are electrically connected to metal terminals 21a, 21b. This can allow the electrode layers 14a, 14b to be protected by the protective layers 17a, 17b, respectively, so that an increase in resistance due to deterioration of the electrode layers 14a, 14b can be satisfactorily suppressed. The protective layers 17a, 17b have a function of protecting the electrode layers 14a, 14b from deterioration, and have, for example, a function of preventing the electrode layers 14a, 14b from being oxidized.

A material of the protective layers 17a, 17b that can be used includes ceramics, glass, or a composite material of ceramics and glass. Examples of the composite material that can be used include a material containing 50% by volume or more, more preferably 60% by volume or more, and still more preferably 70% by volume or more of glass. Examples of the ceramics forming the protective layers 17a, 17b include ceramics such as $SiO_2$—, $Al_2O_3$—, $SiO_2$—$Al_2O_3$—, $SiO_2$—$ZrO_2$—, and $SiO_2$—$Al_2O_3$—$ZrO_2$-based ceramics. Examples of the glass forming the protective layers 17a, 17b that can be used include glass such as lead-free $B_2O_3$—$Bi_2O_3$—, $B_2O_3$—$ZnO$—$Bi_2O_3$—, $B_2O_3$—$ZnO$—, $V_2O_5$—$P_2O_5$—, $SnO$—$P_2O_5$—, $SnO$—$ZnO$—$P_2O_5$—, $SiO_2$—$B_2O_3$—$Bi_2O_3$—, and $SiO_2$—$Bi_2O_3$—$Na_2O$-based glass.

Each of the electrode layers 14a, 14b preferably has a thickness of from 0.01 to 5 mm, and more preferably from 0.01 to 3 mm. Such a range can allow uniform heat generation to be enhanced. The thickness of each of the electrode layers 14a, 14b of 0.01 mm or more can lead to appropriate control of electric resistance, resulting in more uniform heat generation. The thickness of each of the electrode layers 14a, 14b of 5 mm or less can reduce a risk of breakage during canning. The thickness of each of the electrode layers 14a, 14b is defined as a thickness in a direction of a normal line to a tangential line at a measurement point on an outer surface of each of the electrode layers 14a, 14b when observing the point of each electrode layer to be subjected to thickness measurement in a cross section perpendicular to the cell extending direction.

It is preferable that the maximum thickness of each of the protective layers 17a, 17b is 1.5 times or more an average thickness of each of the electrode layers 14a, 14b. That is, the maximum thickness of each of the protective layers 17a, 17b covering the electrode layers 14a, 14b, respectively, is preferably 1.5 times or more an average value (an average thickness of the electrode layer 14a) obtained by measuring the thicknesses at arbitrary positions of each of the electrode layers 14a, 14b. The electrode layers 14a, 14b composed of the metal-ceramic mixed member have higher thermal expansion than that of each of the protective layers 17a, 17b, during electrical heating. However, the maximum thickness of each of the protective layers 17a, 17b is 1.5 times or more the average thickness of each of the electrode layers 14a, 14b, whereby deformation of the electrode layers 14a, 14b due to thermal expansion can be satisfactorily suppressed. Accordingly, breakage of the electrode layers 14a, 14b can be satisfactorily suppressed. Since the strength of the protective layers 17a, 17b increases as the thickness increases, the maximum thickness of each of the protective layers 17a, 17b is more preferably twice or more, still more preferably 3 times or more the average thickness of each of the electrode layers 14a, 14b.

When the maximum thickness of each of the protective layers 17a, 17b is 1.5 times or more the average thickness of each of the electrode layers 14a, 14b, for example, these layers are formed such that only a part of the thickness of each of the electrode layers 14a, 14b can be the same as the maximum thickness of each of the protective layers 17a, 17b and a portion having the part of the thickness of each of the electrode layers 14a, 14b can be the portion 18 of each of the electrode layers 14a, 14b, which is exposed from each of the protective layers 17a, 17b. Also, the electrode layers 14a, 14b may be formed so as to be embedded into the protective layers 17a, 17b, respectively, and then a part of each of the protective layers 17a, 17b may be processed, and the electrode layers 14a, 14b may be dug out to form an exposed portion 18.

The electric resistivity of each of the electrode layers 14a, 14b is lower than the electric resistivity of the pillar shaped honeycomb structure portion 11, whereby the electricity tends to flow preferentially to the electrode layers, and the electricity tends to spread in the cell flow path direction and the circumferential direction during electric conduction. The electric resistivity of the electrode layers 14a, 14b is preferably 1/10 or less, and more preferably 1/20 or less, and even more preferably 1/30 or less, of the electric resistivity of the pillar shaped honeycomb structure portion 11. However, if the difference in electric resistivity between both becomes too large, the current is concentrated between ends of the opposing electrode layers to bias the heat generated in the pillar shaped honeycomb structure portion. Therefore, the electric resistivity of the electrode layers 14a, 14b is preferably 1/200 or more, and more preferably 1/150 or more, and even more preferably 1/100 or more, of the electric resistivity of the pillar shaped honeycomb structure portion 11. In the present invention, the electric resistivity of the electrode layers 14a, 14b is a value measured at 400° C. by a four-terminal method.

Figure 3:
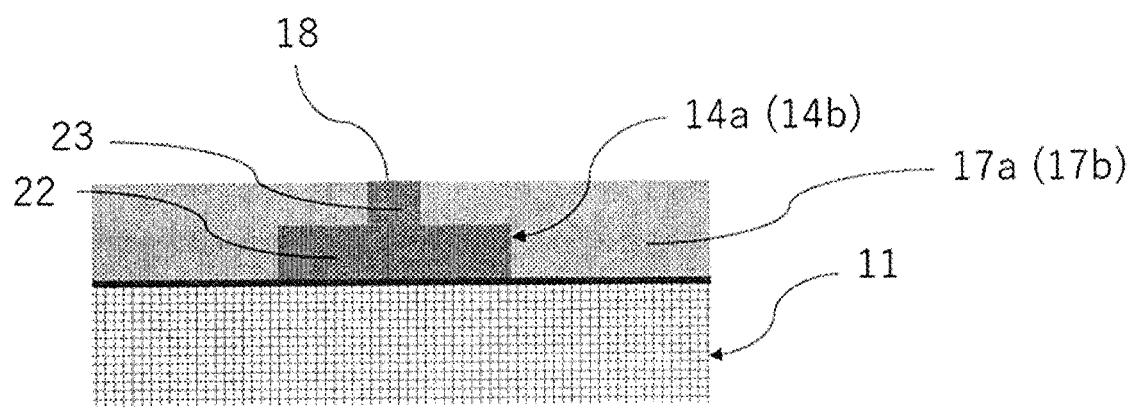
FIG. 3 is a schematic cross-sectional view of a pillar shaped honeycomb structure portion, an electrode layer and a protective layer according to Embodiment 1 of the present invention, which is perpendicular to a cell extending direction.

As shown in FIG. 3, the electrode layers 14a, 14b may be comprised of a support portion 22 on a surface side of the outer peripheral wall 12 of the pillar shaped honeycomb structure portion 11 and a protruding portion 23 rising from the support portion 22. In the structure of FIG. 3, the protective layers 17a, 17b cover the electrode layers 14a, 14b, respectively, such that at least a part of the surface of the protruding portion 23 is exposed. Each of the support portion 22 and the protruding portion 23 may be formed in any shape, including, but not particularly limited to, for example, a flat plate shape having a plane such as a circle, an ellipse and a polygon, or a rod shape extending to a certain length. Each of the support portion 22 and the protruding portion 23 may also have any size. As non-limiting examples, the thickness of the support portion 22 may be from 50 to 300 μm, and the thickness of the protruding portion 23 may be from 100 to 200 μm.

Figure 4:
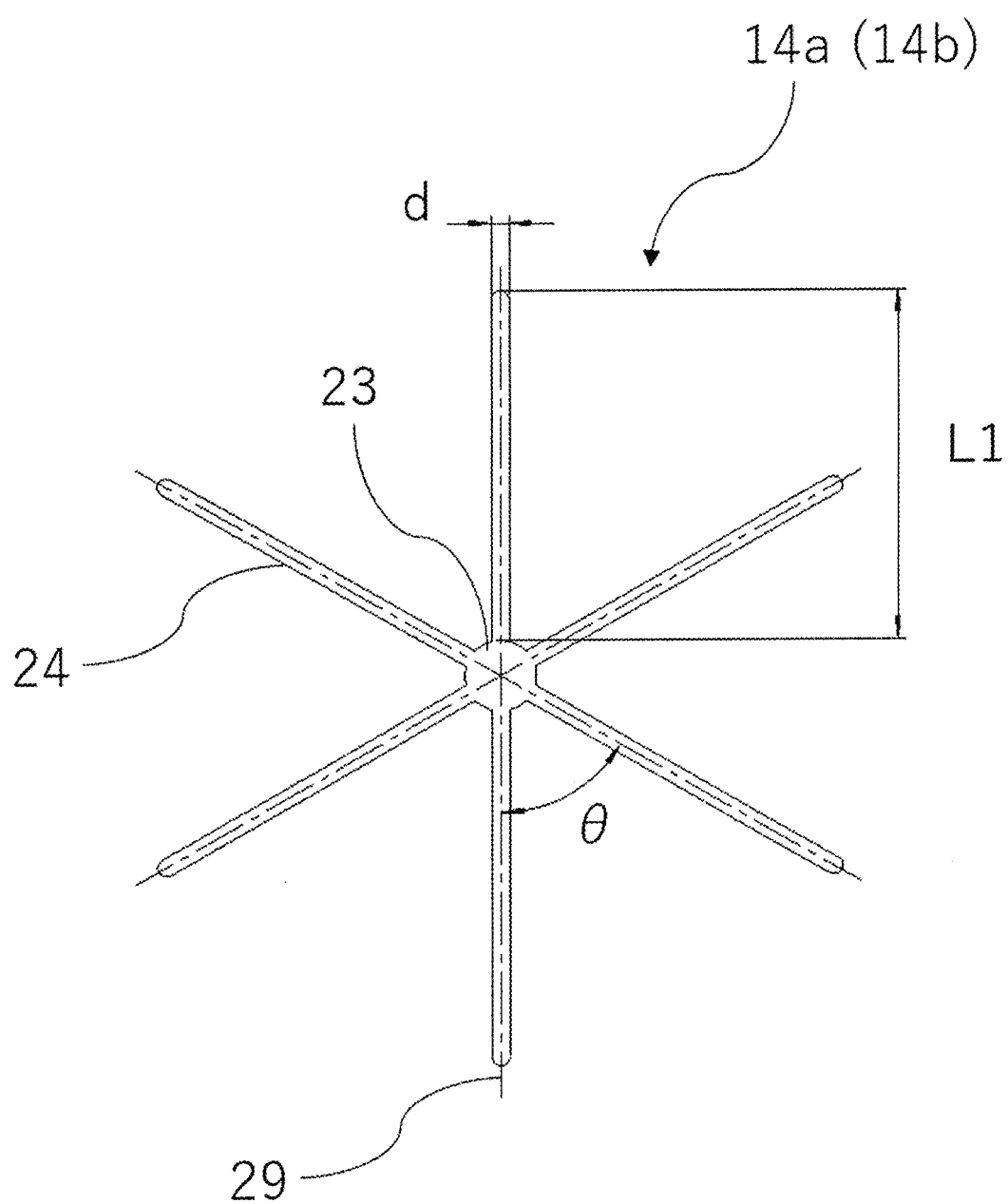
FIG. 4 is a schematic plan view of an electrode layer having a plurality of linear portions extending radially from the center in Embodiment 1 of the present invention.

Each of the electrode layers 14a, 14b may have the shape as shown in the schematic plan view of FIG. 4. That is, each of the electrode layers 14a, 14b may be formed of a plurality of linear portions 24 in which the support portion 22 radially extend from a central point directly below the protruding portion 23, along the surface of the outer peripheral wall 12 of the pillar shaped honeycomb structure portion 11. In such a structure, the protruding portion 23 can be formed in a columnar shape, an elliptical columnar shape, a prismatic shape, or the like. In FIG. 4, the plurality of linear portions 24 radially extending from the central point directly below the protruding portion 23 each has an angle 9 formed by the other linear portion (an angle formed by center lines 29 of two adjacent linear portions 24) of approximately 60°, and the total six linear portions are shown. It is not necessary for the plurality of linear portions 24 to have the same angle 9, and the angles may be different from one another. The number of the linear portions 24 is not particularly limited, and it may be three, four, or five or more. A length L1 and a width d of each linear portion 24 are not particularly limited, and they may be appropriately designed based on the relationships and the lime with the number of the electrode layers 14a, 14b provided in the pillar shaped honeycomb structure portion 11, the size of the protruding portion 23, and the like. For example, in the case of the electrode layers 14a, 14b each having the shape as shown in FIG. 4, a cross section perpendicular to a direction where the protruding portions 23 of the electrode layers 14a, 14b protrude may be a circle having a diameter of from 0.5 to 2 μm, and the length L1 may be from 5 to 30 μm, and the width d may be from 0.5 to 2 μm. Further, the support portion 22 of the electrode layers 14a, 14b may further include at least one branch portion branched from the plurality of linear portions 24 extending radially.

Figure 5:
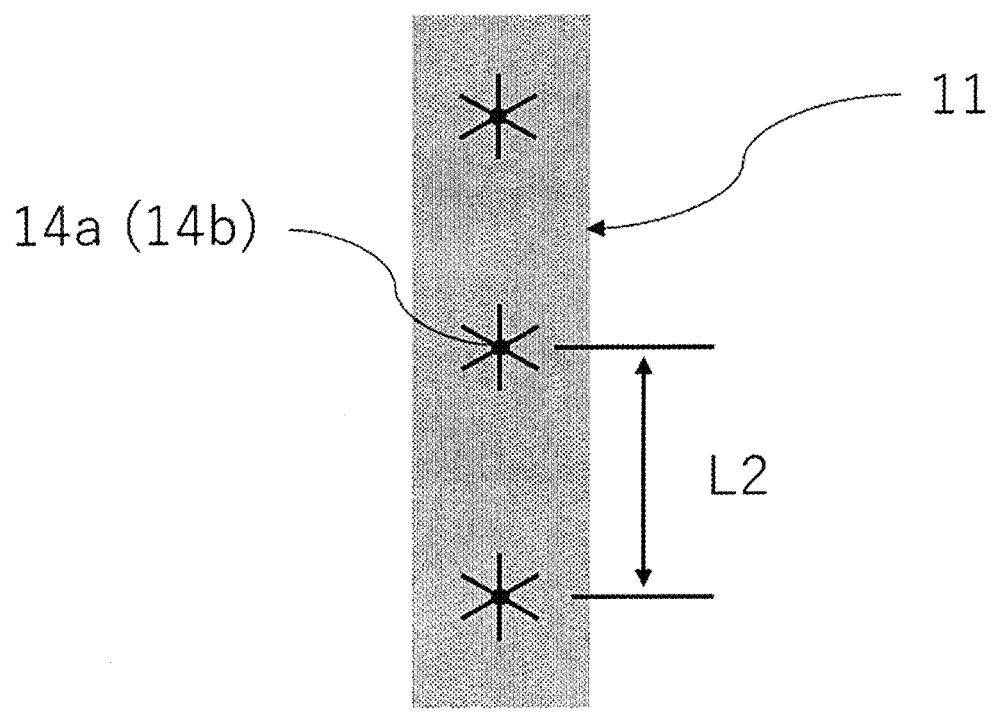
FIG. 5 is a schematic plan view of an electrode layer having the structure shown in FIG. 4 provided in a plurality of regions on a pillar shaped honeycomb structure.

Each of the electrode layers 14a, 14b having the structure as shown in FIG. 4 is preferably provided in a plurality of regions on the pillar shaped honeycomb structure portion 11 at each distance L2, as shown in FIG. 5. This can allow the uniform heat generation of the pillar shaped honeycomb structure portion 11 to be further improved. The distance L2 is not particularly limited, and it can be appropriately designed based on the numbers, sizes and the like of the electrode layers 14a, 14b provided on the pillar shaped honeycomb structure portion 11. For example, when the length L1 of each linear portion 24 of each of the electrode layers 14a, 14b is from 5 to 30 μm, each distance L2 may be from 15 to 60 mm.

(1-2. Metal Terminal)

The pair of metal terminals 21a, 21b are disposed such that one metal terminal of the pair of the metal terminals face the other metal terminal of the pair of metal terminals across the central axis of the pillar shaped honeycomb structure portion 11 of the honeycomb structure 10, and are provided on the pair of electrode layers 14a, 14b, respectively. The metal terminals 21a, 21b are electrically connected to the electrode layers 14a, 14b, respectively, at portions 18 of the electrode layers 14a, 14b that are exposed from the protective layers 17a, 17b, respectively. Accordingly, as a voltage is applied to the metal terminals 21a, 21b through the electrode layers 14a, 14b, then the electricity is conducted through the metal terminals 21a, 21b to allow the honeycomb structure 10 to generate heat by Joule heat. Therefore, the honeycomb structure 10 can be suitably used as a heater. The applied voltage is preferably from 12 to 900 V, and more preferably from 64 to 600 V, although the applied voltage can be changed as needed. The portions 18 of the electrode layers 14a, 14b that are exposed from the protective layers 17a, 17b, respectively, may be portions to be joined to the metal terminals 21a, 21b. The metal terminals 21a, 21b may be electrically connected to the electrode layers 14a, 14b at the portions 18 that are exposed from the protective layers 17a, 17b via other conductive materials.

The material of the metal terminals 21a, 21b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal terminals 21a, 21b are not particularly limited, and they can be appropriately designed according to the size of the electric heating type support 20, the electrical conduction performance, and the like.

By supporting the catalyst on the electric heating type support 20, the electric heating type support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(2. Method for Producing Electric Heating Type Support)

A method for producing the electric heating type support 20 according to the present invention will now be illustratively described. In an embodiment, the method for producing the electric heating type support 20 according to the present invention includes: a step A1 of obtaining an unfired honeycomb structure portion with an electrode layer forming paste; a step A2 of firing the unfired honeycomb structure portion with the electrode layer forming paste to form a honeycomb fired body; a step A3 of providing the honeycomb formed body with protective layers to obtain a honeycomb structure; and a step A4 of welding metal terminals to the honeycomb structure.

The step A1 is to prepare a honeycomb formed body that is a precursor of the honeycomb structure portion, and apply an electrode layer forming paste to a side surface of the honeycomb formed body to obtain an unfired honeycomb structure portion with the electrode layer forming paste. The preparation of the honeycomb formed body can be carried out in accordance with a method for preparing a honeycomb formed body in a known method for producing a honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon is from 10 to 40% by mass relative to the total of mass of silicon carbide powder and mass of metallic silicon. The average particle diameter of the silicon carbide particles in the silicon carbide powder is preferably from 3 to 50 µm, and more preferably from 3 to 40 µm. The average particle diameter of the metallic silicon (the metallic silicon powder) is preferably from 2 to 35 µm. The average particle diameter of each of the silicon carbide particles and the metallic silicon (metallic silicon particles) refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure portion is the silicon-silicon carbide composite material. In the case where the material of the honeycomb structure portion is silicon carbide, no metallic silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metallic silicon powder is 100 parts by mass. An average particle diameter of the pore former is preferably from 10 to 30 µm. If the average particle diameter is less than 10 µm, pores may not be sufficiently formed. If the average particle diameter is more than 30 µm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is then dried. When the length in the central axis direction of the honeycomb structure is not the desired length, both the end faces of the honeycomb structure can be cut to the desired length. The honeycomb structure after drying is referred to as a honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When one forms each electrode layer as a laminated structure, the joining strength between each metal terminal and each electrode layer tends to be improved by increasing an average particle diameter of the metal powder in the past for the second electrode layer, as compared with an average particle diameter of the metal powder in the paste for the first electrode layer. The average particle diameter of the metal powder refers to an arithmetic average diameter on volume basis when frequency distribution of the particle diameter is measured by the laser diffraction method.

The resulting electrode layer forming paste is applied to the side surface of the honeycomb formed body (typically, the honeycomb dried body) to obtain an unfired honeycomb structure portion with an electrode layer forming paste. The method for preparing the electrode layer forming paste and the method for applying the electrode layer forming paste to the honeycomb formed body can be performed according to a known method for producing a honeycomb structure. However, in order to achieve lower electrical resistivity, it is possible to increase a metal content ratio or to decrease the particle diameter of the metal particles as compared with the honeycomb structure portion.

As a variation of the method for producing the honeycomb structure, in the step A1, the honeycomb formed body may be temporarily fired before applying the electrode layer forming paste. That is, in this variation, the honeycomb formed body is fired to produce a honeycomb fired body, and the electrode fired paste is applied to the honeycomb fired body.

In the step A2, the unfired honeycomb structure portion with the electrode layer forming paste is fired to obtain a honeycomb structure. Prior to firing, the unfired honeycomb structure with the electrode layer forming paste may be dried. Also, prior to firing, degreasing may be carried out to remove the binder and the like. As the firing conditions, the unfired honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

In step A3, each protective layer is provided so as to cover each electrode layer of the honeycomb fired body to obtain a honeycomb structure. At this time, each protective layer may be provided such that at least a part of each electrode layer is exposed. Also, a part of each electrode layer may be exposed by forming each protective layer so as to cover the entire electrode layer and then removing a part of each protective layer. A method for forming each protective layer may be carried out by using a sputtering method, or forming each protective layer by applying or spraying a material and then heating it, although it depends on the material. Further, the electrode layer and the protective layer may not be formed in separate steps, and the electrode layer and the protective layer may be simultaneously formed by firing. More particularly, a honeycomb structure provided with electrode layers and protective layers may be produced by further providing protective layers on the unfired honeycomb structure portion with the electrode layer forming paste and then firing it.

In step A4, each metal terminal is welded to the exposed surface of each electrode layer of the honeycomb structure.

A preferable welding method may be laser welding from the metal terminal side, in terms of control of the welded area and production efficiency.

Embodiment 2

An electric heating type support 30 according to Embodiment 2 of the present invention has the same configuration as the electric heating type support 20 according to Embodiment 1, with the exception that the former does not include any metal terminal. That is, the electric heating type support 30 according to Embodiment 2 has the same configuration as the honeycomb structure 10 of the electric heating type support 20 according to Embodiment 1 as shown in FIG. 2. The electric heating type support 30 can be used as an electric heating type support as in Embodiment 1, by providing metal terminals to portions of the electrode layers that are exposed from the protective layers, to electrically connect them.

(3. Exhaust Gas Purifying Device)

The electric heating type support according to the embodiment of the present invention can be used for an exhaust gas purifying device. The exhaust gas purifying device includes the electric heating type support and a can body for holding the electric heating type support. In the exhaust gas purifying device, the electric heating type support can be installed in an exhaust gas flow path for allowing an exhaust gas from an engine to flow. As the can body, a metal tubular member or the like for accommodating the electric heating type support can be used.

EXAMPLES

Hereinafter, Examples is illustrated for better understanding of the present invention and its advantages, but the present invention is not limited to these Examples.

Example 1

(1. Production of Circular Pillar Shaped Green Body)

Silicon carbide (SiC) powder and metallic silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide (SiC) powder and the metallic silicon (Si) powder was 100 parts by mass. The content of the pore former was 3 parts by mass when the total of the silicon carbide (SiC) powder and the metallic silicon (Si) powder was 100 parts by mass. The content of water was 42 parts by mass when the total of the silicon carbide (SiC) powder and the metallic silicon (Si) powder was 100 parts by mass. The average particle diameter of the silicon carbide powder was 20 μm, and the average particle diameter of the metallic silicon powder was 6 μm. The average particle diameter of the pore former was 20 μm. The average particle diameter of each of the silicon carbide powder, the metallic silicon powder and the pore former refers to an arithmetic mean diameter on volume basis, when measuring frequency distribution of the particle size by the laser diffraction method.

(2. Production of Honeycomb Dried Body)

The resulting pillar shaped green body was formed using an extruder having a grid pattern-like die structure to obtain a circular pillar shaped honeycomb formed body in which each cell had a square shape in a cross section perpendicular to the flow path direction of the cells. The honeycomb formed body was subjected to high-frequency dielectric heating and drying and then dried at 120° C. for 2 hours using a hot air drier, and a predetermined amount of both end faces were cut to prepare a honeycomb dried body.

(3. Preparation of Electrode Layer Forming Paste)

Tantalum silicide ($TaSi_2$) powder, metallic silicon (Si) powder, silicon carbide (SiC) powder, methyl cellulose, glycerin, and water were mixed by a planetary centrifugal mixer to prepare an electrode layer forming paste. The $TaSi_2$ powder, the Si powder, and the SiC powder were blended in a volume ratio of $TaSi_2$ powder: Si powder: SiC powder=50: 30:20. When the total of $TaSi_2$ powder, Si powder and SiC powder was 100 parts by mass, methyl cellulose was 0.5 parts by mass, glycerin was 10 parts by mass, and water was 38 parts by mass. The average particle diameter of the tantalum silicide powder was 7 μm. The average particle diameter of the metallic silicon powder was 6 μm. The average particle diameter of the silicon carbide powder was 35 μm. Each of these average particle diameters refers to an arithmetic average diameter on volume basis when frequency distribution of the particle diameter is measured by the laser diffraction method.

(4. Application of Paste)

The electrode layer forming pastes as described above were applied at the total ten positions (five positions×two rows for one side) as shown in the electrode layer arrangement of FIG. 2, so as to face each other across the central axis. The honeycomb dried body after application of the electrode layer forming paste was then dried at 120° C. to obtain an unfired honeycomb structure portion with the electrode layer forming paste.

(5. Firing)

The unfired honeycomb structure portion with the electrode layer forming paste was then degreased in an air atmosphere at 550° C. for 3 hours. The degreased unfired honeycomb structure portion with the electrode layer forming paste was then fired and subjected to an oxidization treatment to produce a honeycomb fired body. The firing was carried out in an argon atmosphere at 1450° C. for 2 hours. The oxidation treatment was carried out in the atmosphere at 1300° C. for one hour.

The honeycomb fired body had circular end faces each having a diameter of 100 mm, and a height (a length in the flow path direction of the cells) of 100 mm. The cell density was 93 cells/$cm^2$, the thickness of the partition wall was 101.6 μm, the porosity of the partition walls was 45%, and the average pore diameter of the partition walls was 8.6 μm. The thickness of each electrode layer was 0.2 mm. The electrical resistivity at 400° C. was measured by a four-terminal method using samples having the same materials as those of the honeycomb structure and the electrode layer, indicating that it was 5 Ωcm, 0.01 Ωcm, and 0.001 Ωcm, respectively.

(6. Formation of Protective Layer)

Glass was then applied so as to cover each electrode layer of the honeycomb fired body, and then fired in an air atmosphere at 1000° C. for 6 hours to form each protective layer having the thickness as shown in Table 1. Subsequently, a part of each protective layer on each electrode layer was removed with a router such that the surface of each electrode layer was exposed in an area of 3.14 $mm^2$. Thus, the honeycomb structures according to Examples 1 to 4 were produced.

Further, as Comparative Example 1, a honeycomb structure was produced by the same method as that of Example 1, with the exception that each electrode layer was composed of SUS430 and no protective layer was provided.

(7. Welding of Metal Terminals)

SUS plate-shaped metal terminals (each dimension: 30 mm×50 mm×0.5 mmt) were brought into contact with the exposed portions of the respective electrode layers of the honeycomb structure obtained under the above producing conditions. Subsequently, each plate-shaped metal terminal was welded to each electrode layer by irradiation with a laser at an output of 180 W/mm² from the metal terminal side using a fiber laser welding machine. The thickness of each plate-shaped metal terminal was 0.4 mm. Thus, each sample of each electric heating type support was produced.

(8. Electric Heating Test)

An external power supply was connected to the metal terminals of each sample, and electric heating was carried out at an applied voltage of 300 V for 30 seconds, and the electric heating test was conducted by repeating the electric heating 50 times. Subsequently, for each sample after the repeated test of the electric heating, the presence or absence of breakage of the electrode layers was examined depending on whether or not the electric conduction was possible. A sample in which the electric conduction was possible was defined as "OK", which was determined that a honeycomb structure having the effects of the present invention was obtained. On the other hand, a sample in which the electric conduction was not possible was defined as "NG", which was determined to be a honeycomb structure having no effect of the present invention. Further, the electrical resistivity at 400° C. for each sample after conducting the electric heating 50 times was measured by a four-terminal method, and an increasing rate (resistance increasing rate) from that before electric heating was measured.

TABLE 1

| | Material of Electrode Layer | Thickness of Electrode Layer [mm] | Thickness of Protective Layer [mm] | Possibility of Electric Conduction | Resistance Increasing Rate [times] |
|---|---|---|---|---|---|
| Comp. 1 | SUS430 | 0.2 | — | NG | — |
| Example 1 | 50TaSi/30Si/20SiC | 0.2 | 0.3 | OK | 1.7 |
| Example 2 | 50TaSi/30Si/20SiC | 0.2 | 0.4 | OK | 1.4 |
| Example 3 | 50TaSi/30Si/20SiC | 0.2 | 0.6 | OK | 1.2 |
| Comp. 2 | 50TaSi/30Si/20SiC | 0.2 | 1.0 | OK | 1.2 |

(9. Discussion)

In Examples 1 to 4, each electrode layer was composed of the metal-ceramic mixed member, had a decreased difference in thermal expansion from the pillar shaped honeycomb structure, and caused no damage even if the electric heating was repeated 50 times. Further, it is believed that each protective layer suppresses oxidation even if the temperature of each electrode layer is increased, and deterioration of each electrode layer can be successfully suppressed. This would be clear from the good results of the resistance increasing rate of 1.7 times or less. In Examples 2 to 4, since each protective layer was formed so as to have an increased thickness as compared with Example 1, the strength of each protective layer was increased, and breakage of each protective layer due to the difference in thermal expansion was more satisfactorily suppressed. As a result, it is believed that the oxidation of each electrode layer was suppressed, and an increase in resistance was more satisfactorily suppressed.

On the other hand, in Comparative Example 1, as a result of embedding a metal as an electrode layer material, each electrode layer was broken. In Comparative Example 1, any protective layer was not provided, and each electrode layer would be degraded by repeating the electric heating 50 times.

DESCRIPTION OF REFERENCE NUMERALS 10 honeycomb structure
11 pillar shape honeycomb structure
12 outer peripheral wall
13 partition wall
14a, 14b, electrode layer
15 cell
17a, 17b protective layer
20, 30 electric heating type support
21a, 21b metal terminal
22 support portion
23 protruding portion
24 linear portion
29 center line of linear portion

The invention claimed is:

1. An electric heating type support, comprising:
a honeycomb structure comprising:
a pillar shaped honeycomb structure portion including: an outer peripheral wall; and porous partition walls disposed on an inner side of the outer peripheral wall, the porous partition walls defining a plurality of cells, each of the cells penetrating from one end face to other end face to form a flow path;
a pair of electrode layers disposed so as to face each other across a central axis of the pillar shaped honeycomb structure portion, each of the pair of electrode layers being disposed on a surface of the outer peripheral wall; and
protective layers covering the electrode layers, respectively, such that at least a part of each of the pair of electrode layers is exposed; and
a pair of metal terminals provided on the pair of electrode layers,
wherein each of the pair of electrode layers is composed of a metal-ceramic mixed member having a metal ratio of from 30 to 75% by volume, and
wherein a portion of each of the pair of electrode layers that is exposed from the protective layer is electrically connected to each of the pair of metal terminals.

2. The electric heating type support according to claim 1, wherein a maximum thickness of each of the pair of protective layers is 1.5 times or more an average thickness of each of the pair of electrode layers.

3. The electric heating type support according to claim 1, wherein each of the pair of electrode layers comprises:
a support portion on a surface side of the outer peripheral wall; and
a protruding portion rising from the support portion, and
wherein each of the pair of protective layers is provided such that at least a part of a surface of the protruding portion is exposed.

4. The electric heating type support according to claim 3, wherein the support portion is formed of a plurality of linear portions radially extending from a central point directly below the protruding portion, along the surface of the outer peripheral wall.

5. The electric heating type support according to claim 4, wherein the support portion further comprises at least one branch portion branched from the plurality of linear portions extending radially.

6. The electric heating type support according to claim 1, wherein each of the pair of electrode layers is divided into a plurality of regions.

7. The electric heating type support according to claim 1, wherein the portion of each of the pair of electrode layers that is exposed from each of the pair of protective layers is a portion to be joined to each of the metal terminals.

8. An exhaust gas purifying device, comprising: the electric heating type support according to claim 1; and a can body for holding the electric heating type support.

9. An electric heating type support, comprising:
a honeycomb structure comprising:
a pillar shaped honeycomb structure portion including: an outer peripheral wall; and porous partition walls disposed on an inner side of the outer peripheral wall, the porous partition walls defining a plurality of cells, each of the cells penetrating from one end face to other end face to form a flow path; and
a pair of electrode layers disposed so as to face each other across a central axis of the pillar shaped honeycomb structure portion, each of the pair of electrode layers being disposed on a surface of the outer peripheral wall; and
protective layers covering the electrode layers, respectively, such that at least a part of each of the pair of electrode layers is exposed,
wherein each of the pair of electrode layers is composed of a metal-ceramic mixed having a metal ratioi of from 30 to 75% by volume, and
wherein each of the pair of electrode layers has a portion exposed from the protective layer, and being configured to electrical connection to each of a pair of metal terminals.

* * * * *